C. E. MOREHOUSE.
PERFORATING MACHINE FOR LEAVES OR SHEETS.
APPLICATION FILED SEPT. 1, 1911.
1,080,073.
Patented Dec. 2, 1913.
6 SHEETS—SHEET 2.
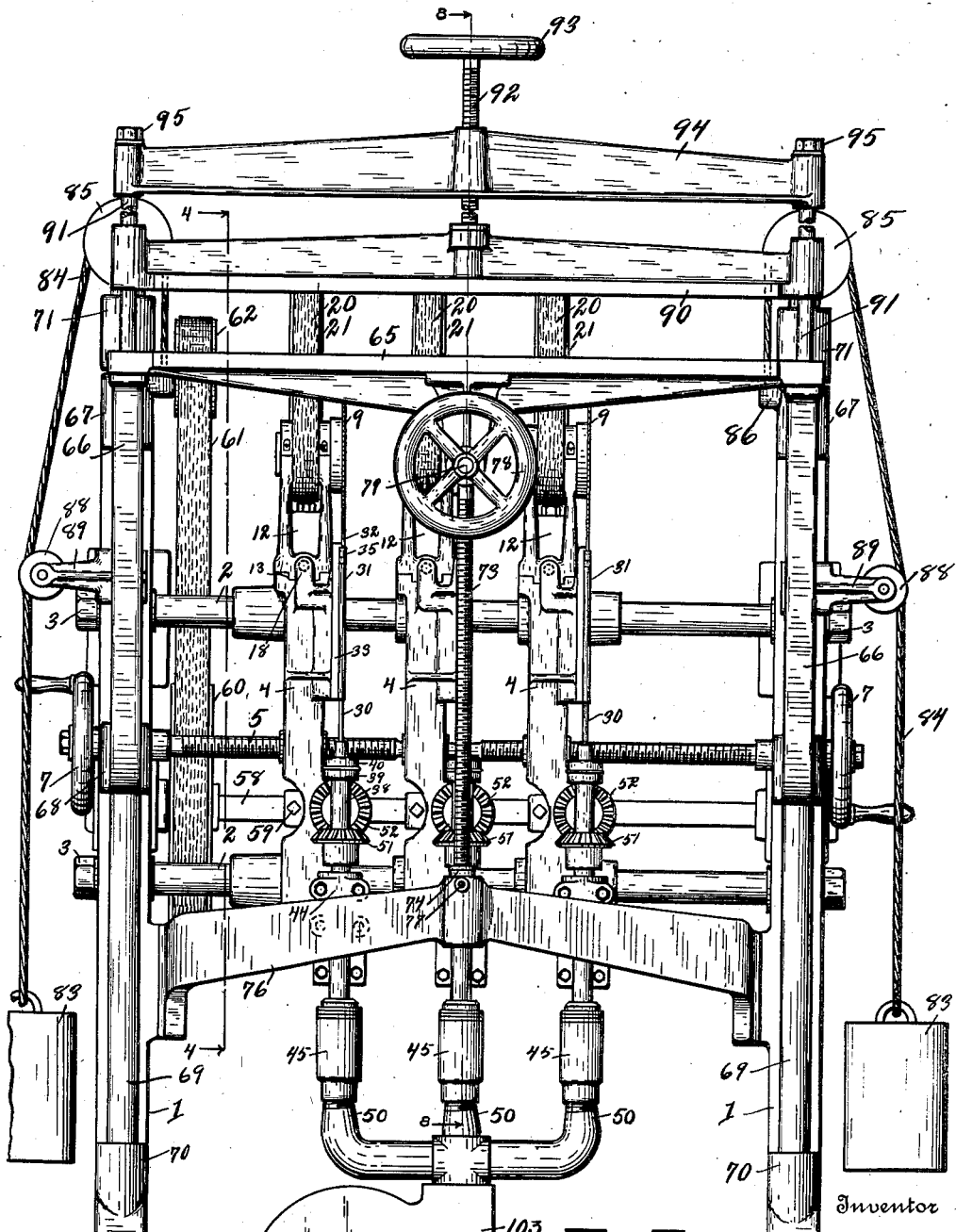
Fig. II.
Witnesses
L. G. Greenfield
M. L. Glasgow
Inventor
Cyrus E. Morehouse
Chappell & Earl
Attorneys C. E. MOREHOUSE.
PERFORATING MACHINE FOR LEAVES OR SHEETS.
APPLICATION FILED SEPT. 1, 1911.
1,080,073.
Patented Dec. 2, 1913.
6 SHEETS—SHEET 3.
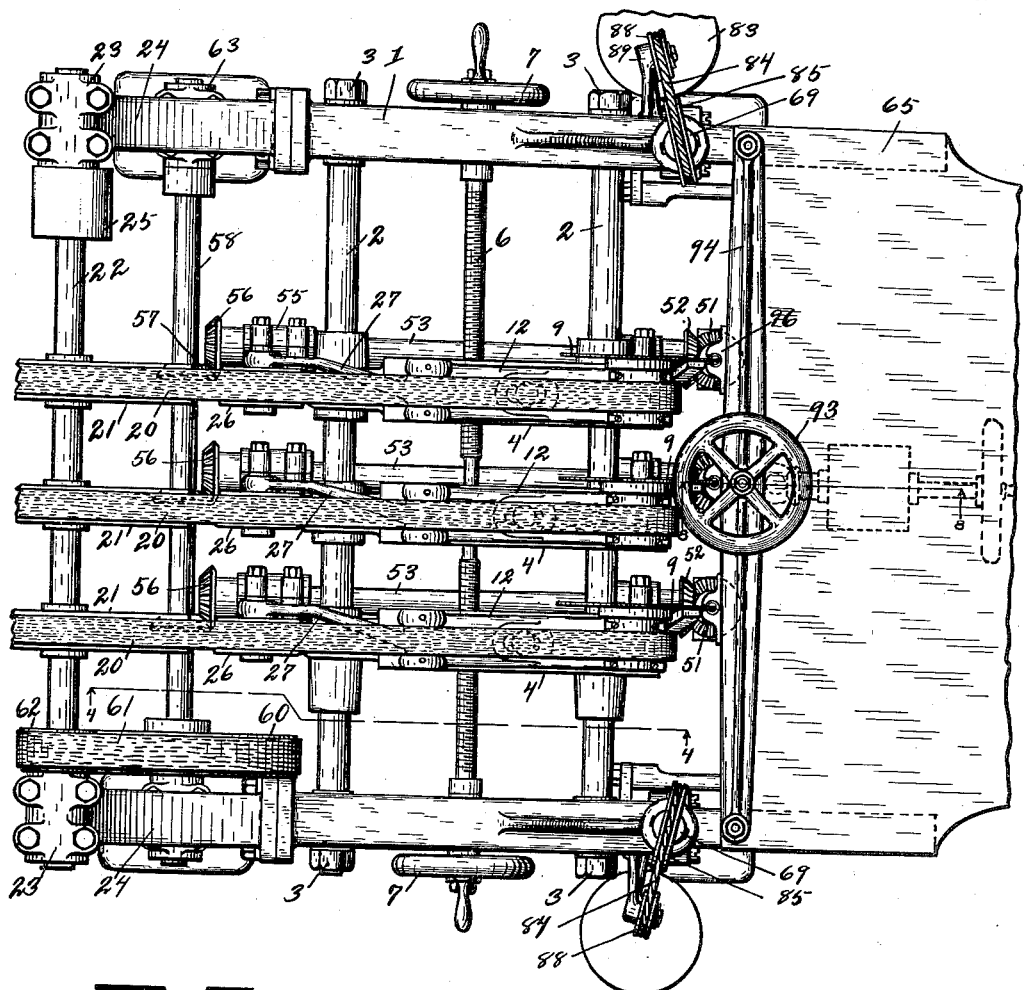
Fig. III.
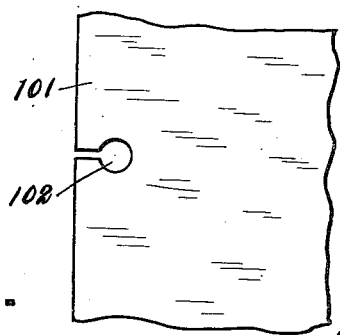
Fig. X.

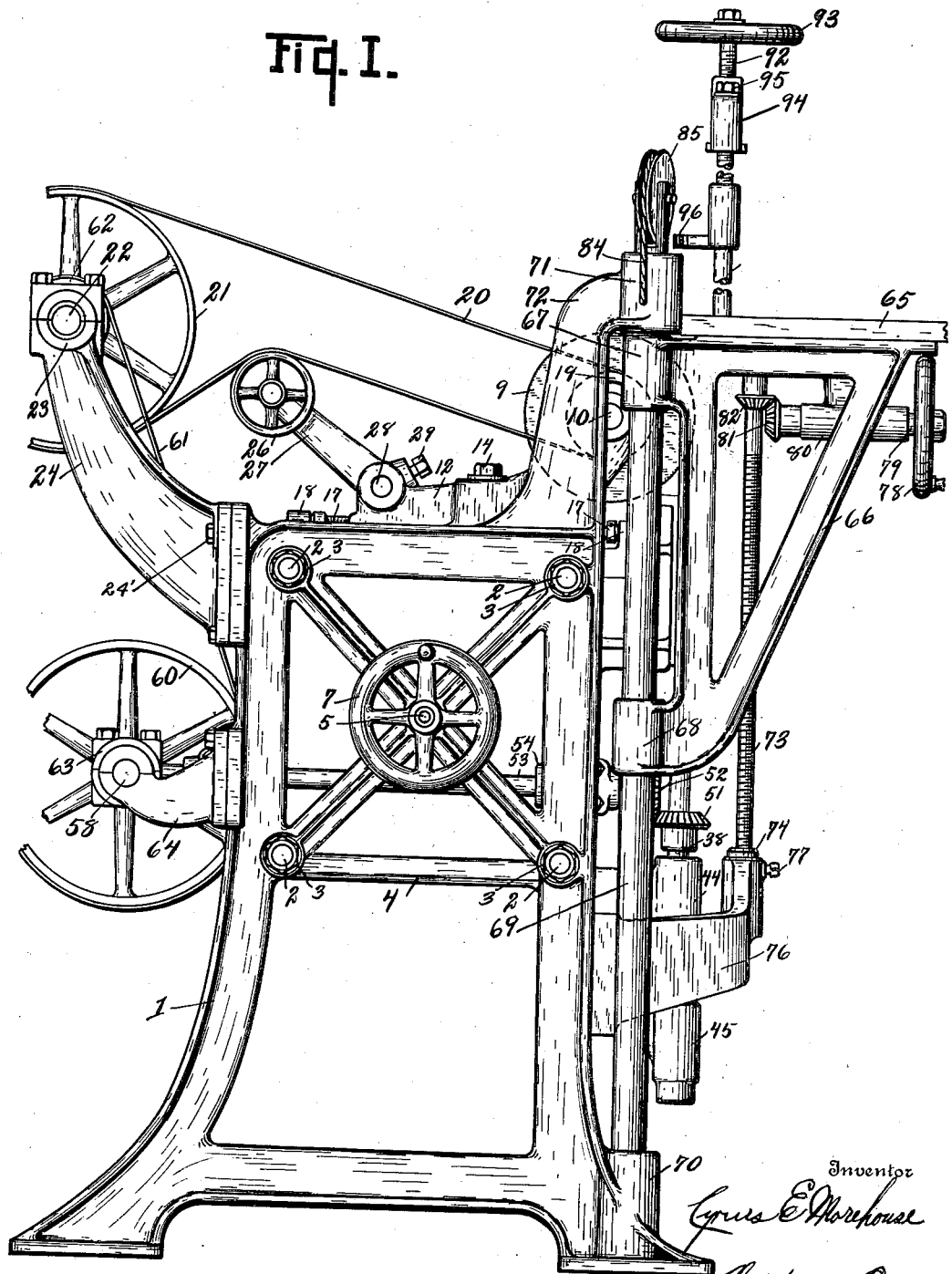

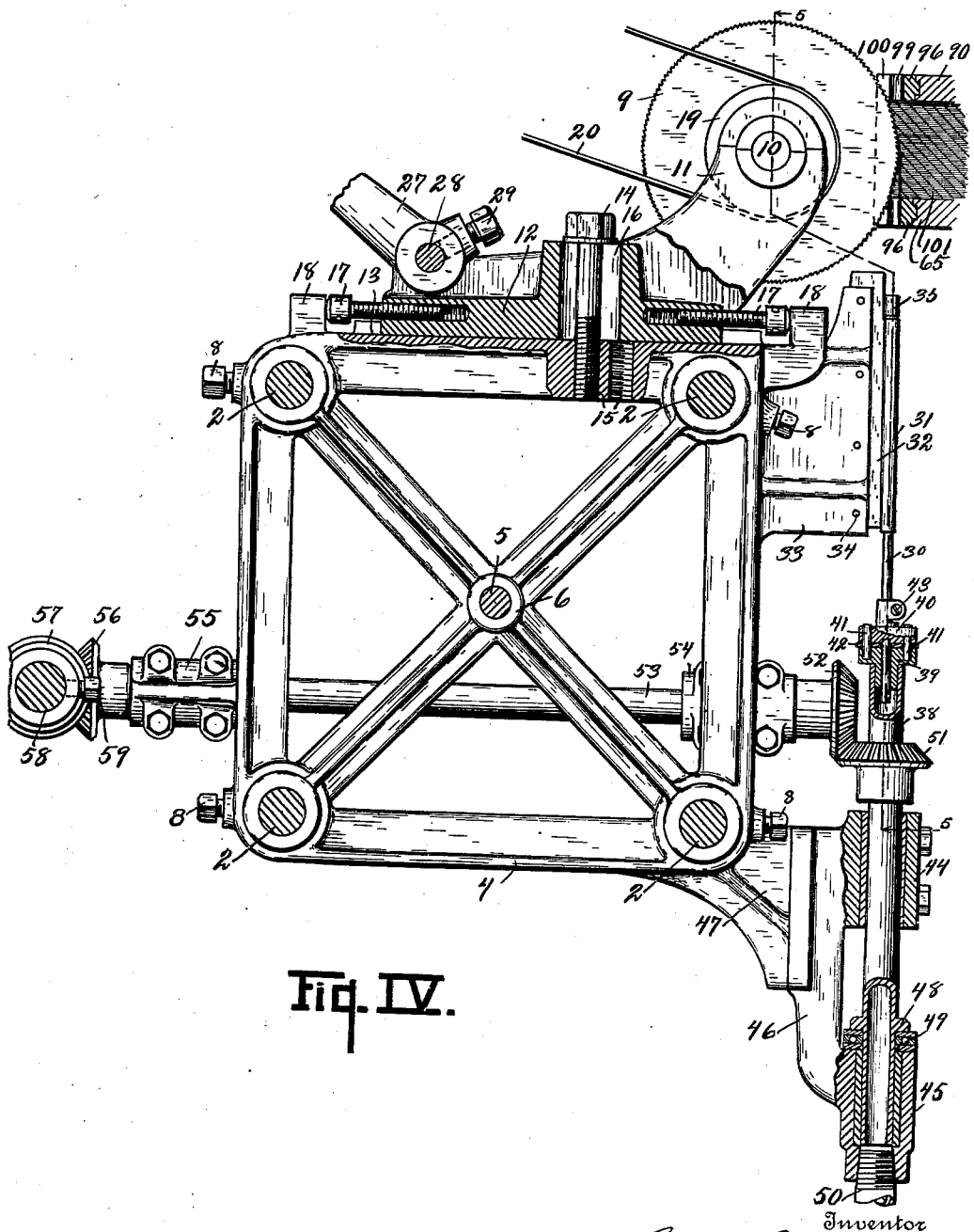
Fig. IV.

C. E. MOREHOUSE.
PERFORATING MACHINE FOR LEAVES OR SHEETS.
APPLICATION FILED SEPT. 1, 1911.
1,080,073.
Patented Dec. 2, 1913
6 SHEETS—SHEET 5.
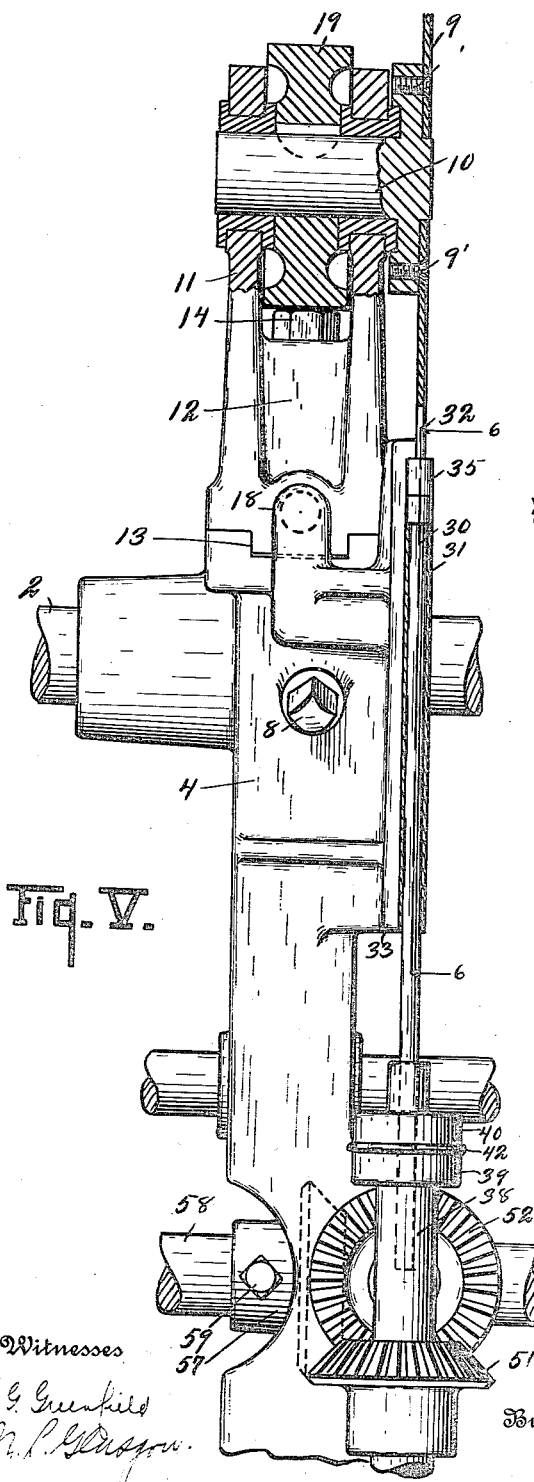
Fig. V.
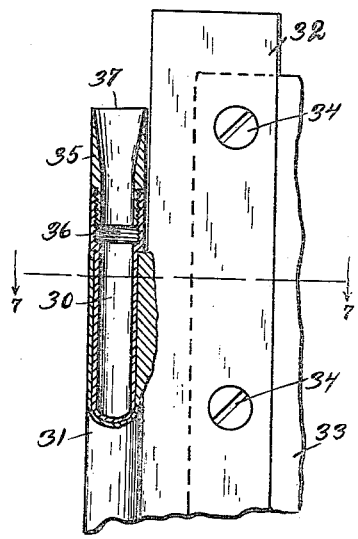
Fig. VI.
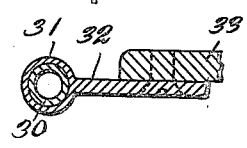
Fig. VII.
Witnesses
Inventor
Cyrus E Morehouse
By Chappell & Earl
Attorneys C. E. MOREHOUSE.
PERFORATING MACHINE FOR LEAVES OR SHEETS.
APPLICATION FILED SEPT. 1, 1911.
1,080,073.
Patented Dec. 2, 1913.
6 SHEETS—SHEET 6.
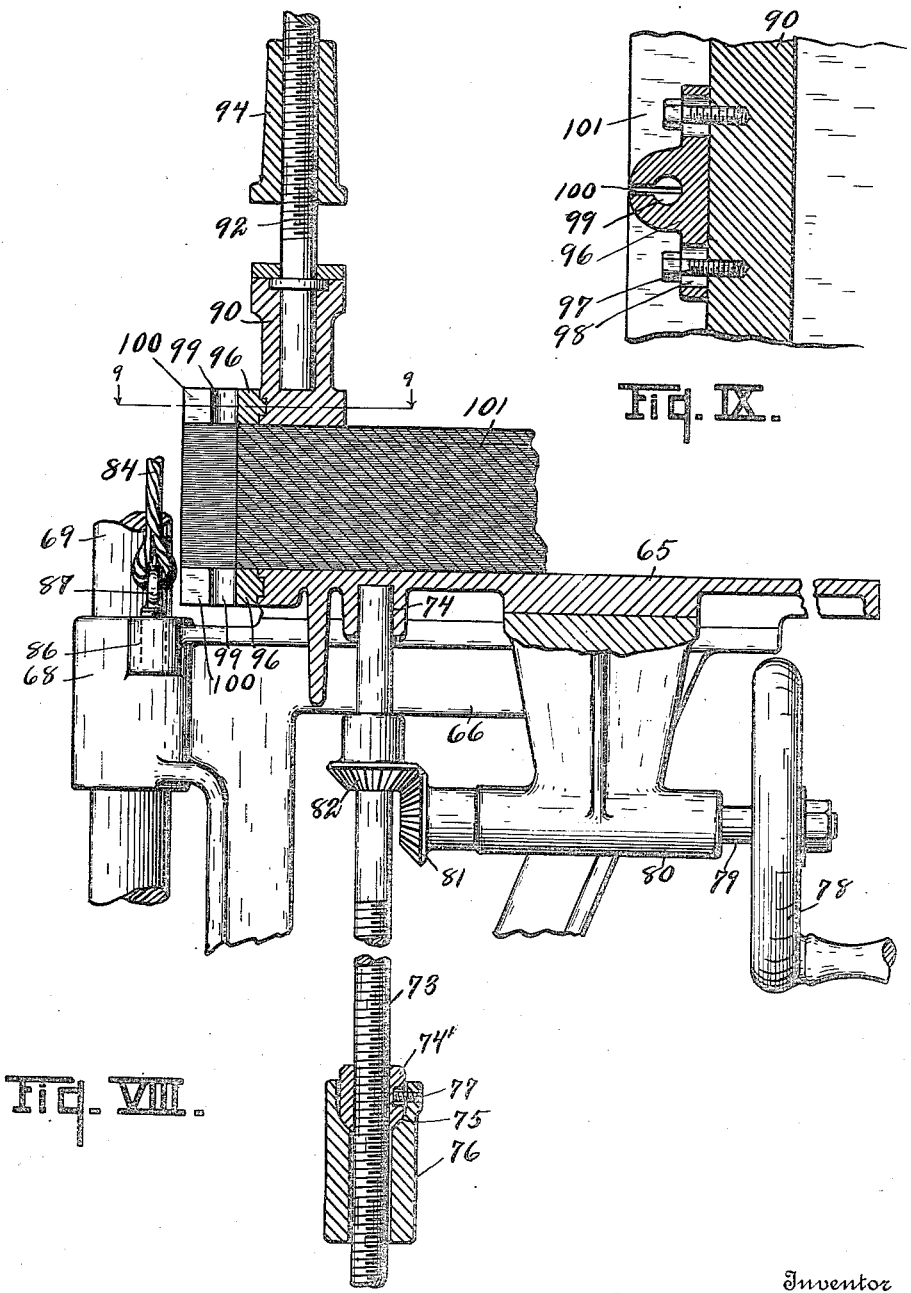

UNITED STATES PATENT OFFICE.

CYRUS E. MOREHOUSE, OF MILWAUKEE, WISCONSIN.

PERFORATING-MACHINE FOR LEAVES OR SHEETS.

1,080,073.  Specification of Letters Patent.  Patented Dec. 2, 1913.

Application filed September 1, 1911. Serial No. 647,148.

*To all whom it may concern:*

Be it known that I, CYRUS E. MOREHOUSE, a citizen of the United States, residing at Milwaukee, Wisconsin, have invented certain new and useful Improvements in Perforating-Machines for Leaves or Sheets, of which the following is a specification.

This invention relates to an improved perforating and slotting machine for leaves or sheets.

The objects of the invention are: First, to provide an improved perforating and slotting machine of efficient and superior design. Second, to provide in such a structure an improved slotting and perforating means. Third, to provide an improved adjusting means for spacing a gage or plurality of such devices. Fourth, to provide an improved method of perforating and slotting sheets for loose leaf binders.

Further objects, and objects pertaining to details of operation and economies of construction will definitely appear from the detailed description to follow.

I accomplish the objects of my invention by the mechanism described in the following specification.

The invention is clearly defined and pointed out in the claims.

A machine constituting one effective and preferred embodiment of my invention is clearly illustrated in the accompanying drawing, forming a part of this specification, in which, Figure I is a side elevation view of a machine embodying features of my invention, portions of the pulleys and paper table being broken away. Fig. II is a front elevation view of such machine. Fig. III is a plan view of the machine, substantially as it appears in Fig. I, the same parts being broken away. Fig. IV is a detail sectional elevation taken on a line corresponding to the lines 4—4 of Figs. II and III, showing details of one of the adjustable sections of the machine. Fig. V is an enlarged sectional view taken on a line corresponding to the irregular section line 5—5 of Fig. IV, showing details of the slotting and perforating means. Fig. VI is an enlarged detail sectional view on lines 6—6 of Fig. V, showing details of the cutter portion of the perforator device. Fig. VII is a detail transverse sectional view on line 7—7 of Fig. VI looking down, showing further details of the perforating device. Fig. VIII is an enlarged detail sectional view through the paper table and clamp and table actuating and adjusting means, taken on a line corresponding to line 8—8 of Figs. II and III, certain portions being shown in full lines. Fig. IX is a detail sectional view on line 9—9 of Fig. VIII, showing details of the paper clamp. Fig. X is a detail view of a portion of a loose sheet showing the style of perforation and slot therein.

In the drawing, similar numerals of reference refer to similar parts throughout the several views, and the sectional views are taken looking in the direction of the little arrows at the ends of the section lines.

Considering the numbered parts of the drawing, the frame is made of end sections or castings 1—1, which are coupled together by four horizontal transverse round bars 2, which are clamped thereto by suitable nuts 3 on the ends thereof. Carried on these transverse round bars are a series of adjustable frames 4, each carrying a paper perforating and slotting device, the same being adjustable to locate the slots in the right place. Bosses 6 are provided at the center of each frame 4, which are engaged by the screws 5, each of which is controlled by a hand wheel 7, one at each side of the machine.

An adjustable paper table, with suitable paper clamp, is provided, with suitable means for moving it up and down in front of this frame work, the details of which will be fully described hereafter.

The frame sections 4 are secured in place after adjustment by means of set screws 8—8, at each corner thereof.

A buzz saw 9 for slitting the paper is on a suitable arbor 10, carried in a bracket 11. The bracket 11 is adjustably secured on the upper edge of the frame section 4, by a suitable guide block 12 resting on a guideway 13. The block is clamped in place by a cap screw 14 through a longitudinal slot 16 therein, a series of holes 15 being provided for the cap screw 14. Set screws 17 journaled in suitable bosses 18 engage screw threaded holes in the guide block 12 to facilitate accurate adjustment of the same. Suitable heads are provided for engagement by spanner wrench or otherwise for this purpose.

Each saw arbor 10 is driven by a pulley 19, which is driven by a belt 20 from a suitable corresponding pulley driving wheel 21 on shaft 22. Shaft 22 is supported in bearing box 23 carried by the bracket arm 24, which is secured by cap screws 24' to the sides of the frame 1. The shaft 22 is driven by the pulley 25. This drives all the saws at the same time. (See particularly Fig. III).

An idle pulley 26 for each belt 20, is carried on an arm 27, which is pivoted at 28 on the base 12 and is clamped in place by the set screw 29. This is the means for adjusting the tension on each belt 20 to insure proper driving of the corresponding buzz saw.

On the front of each frame section 4 is a vertical tubular spindle 30, which is carried in a vertical tubular bearing 31. This tubular bearing 31 is a part of the vertical thin plate 32, which is secured by suitable screws 34 or other means to the vertical plate 33, constituting a part of the frame 4. The upper end of the tubular shaft 30 is enlarged to the size of the exterior of the tubular bearing 31, and is screw threaded at 36. A rotary tubular cutter 35 is screw threaded onto and is carried by the tubular spindle. The upper edge 37 of this cutter 35 is irregular, the same being brought to a circular edge on a circle of exactly the diameter of the exterior of the tubular bearing 31. This rotary cutter spindle 30 is driven by the vertical revolving shaft 38, which has an enlarged head 39, which receives a head 40 on the lower end of the shaft 30 to which it is adjustably secured by the set screw 43. Vertical pins 41 are in the head 40 and project through a plate 42 into the head 39, whereby the parts are adjustably coupled together for driving the same and in such a way as to permit a slight adjustment to insure the even running of the tubular shaft 30 in its tubular bearing 31.

The shaft 38 is adjustable in an eccentric bushing in the bearing 44, and extends into a bearing 45 beneath. A thrust collar 48 is provided to contact with the thrust ball bearing 49. These parts are carried by the bracket 46, which is adjustable on an arm 47 on the front of the frame section 4. A suction hose 50 is connected to the lower end of this boxing 45 to draw any chips that may be cut from the paper, down through the tubular cutter 35.

Each tubular cutter is driven by a bevel gear 51, which is driven from the corresponding gear 52 which meshes therewith. Each gear 52 is mounted on a shaft 53 which is carried in suitable boxings 54, 55 at the sides of the frame 4. A bevel gear 56 is on the rear end of shaft 53 and meshes with the driving gear 57 on the transverse driving shaft 58. The gears 57 are adjustable on shaft 58 by the set screws 59, so that they can be brought into mesh with the gears 56 after the frames 4 have been adjusted into the required position for the work intended.

The shaft 58 is provided with a pulley 60, and has a driving belt 61 which is driven from pulley 62 on the counter shaft 22. The shaft 58 is carried in the journal boxes 63 at each side on the detachable arm brackets 64 secured to the back sides of the frame ends 1 at each end of the machine.

The adjustable paper table 65 is braced by brackets 66, which are provided with bosses 67, 68, which embrace the vertical guiding posts 69, which are seated in sockets 70, at the bottom and bosses 71 on brackets 72 on the end pieces of the frame. This arrangement permits the table to be moved up and down.

The table is moved up and down by the vertical screw 73, which fits into a thrust bearing 74 on the under side of the table 65 and engages in the threaded nut 74' at the bottom. This threaded nut 74' rests in the sprocket 75 in the upper side of the cross frame bar 76. A set screw 77 prevents the rotation of the nut so that when the shaft 73 is rotated, it travels up and down within the same.

A beveled gear 82 is provided on the screw 73, and this is driven by a beveled gear 81 carried on the horizontal shaft 79. Shaft 79 is journaled on the hanger on the underside of the table 65. The shaft 79 is driven by the hand wheel 78, as clearly appears in Figs. I, II and VIII.

Counterbalance weights 83, on the cables 84 disposed over guide pulleys 85 are connected to bosses 86 on the table 65 for counterbalancing the same. Guide pulleys 88 on arms 89 are provided to guide the cords 84 properly to position so that the weights will clear the frame.

A paper clamp 90 is provided on suitable upright guides 91 for clamping the paper into place on the table. A hand screw 92, with a hand wheel 93 is inserted into the top cross bar 94 for forcing clamp 90 to place. This cross bar 94 is held in place on the vertical guide rods 91 by cap screws 95, 95. Adjustable clamping guides 96, are disposed above and below the stack of paper 101 for clamping the same in position. The adjustable guides 96 are secured to the front sides of the clamp 90, and the table 65 by suitable adjusting bolts 97 in slots 98 (see Fig. 9).

The guides 96 are provided with round apertures 99, for the passage of the circular cutter 35, and with slots 100 for the passage of the circular or buzz saw. The sheets 101 are thus securely clamped in position to be perforated and slotted. They are, it will be observed, perforated at 102 with a round perforation, with a slot at one side (see particularly Fig. X).

The suction fan 103 is connected to the couplings 45 by the hose 50 to draw air down through the tubular cutters and carry away the waste from the cutters.

I have thus described the various parts of my improved machine, and will now indicate their operation.

In the use of my device, a pile of sheets 101 is placed upon the table 65, having been suitably jogged to place so that they are perfectly even. The clamp 90 is adjusted thereon and is screwed down to place, the guide portions 96 having been adjusted to the precise point required. The slotting and perforating sections are then adjusted exactly to correspond to the guide, and the table is elevated so that the sheets are entirely above the circular saws and the machine is set in motion. The table is then lowered by manipulating the hand wheel 78, when it will be observed that the buzz saw 9 first cuts a slot in the side of the sheet, as appears in Fig. VIII, substantially through to the back of the circular portion of the slot. The table is then carried on downward so that the sheets pass into contact with the rotary cutter 35 which cuts the round hole in the sheets of paper when it is revolved, and owing to the fact that the paper has been divided by the circular saw, the chips or pieces of paper are sucked downwardly and immediately away from the cutter so that there is a free surface presented for the cutting edge at all times. There is consequently no tendency to bind the cutter, and, owing to the fact that the cutter is supported well up toward the cutting edge by the plate 32, which enters the narrow portion of the slot formed by the saw, the hole is cut perfectly straight through any mass of paper no matter how thick within the dimension and capacity of the machine. In this way a thick loose leaf catalogue can be cut at a single operation perfectly true and even. All of the perforations can be cut at the same time in exactly the same spaced relation, all of which is of very great advantage in avoiding the necessity for repeated adjustments. A pile of leaves from seven to ten inches thick can be cut as even and as true as a half dozen sheets by an ordinary punch.

I have shown my invention embodied in an elaborate machine, with three of the cutters arranged in a gang. A pair might be made use of, and also, it will be very clear that a single cutting device might be made use of cutting one slot at a time, but where a large amount of work is to be done, this would result in a serious loss of time because all of the slots might as well be cut at the same operation.

I have shown the machine elaborately worked out for the purpose in a preferred form.

Having thus described my invention, what I claim as new and desire to secure by Letters Patent, is:

1. In a perforating machine for leaves or sheets, the combination of a suitable frame made up of ends having horizontal lateral bars connecting the same; machine sections adjustably supported on the said lateral bars with means for adjusting the same; a buzz saw with means to drive the same, carried on the upper portion of each of said machine sections; a tubular circular perforating cutter disposed beneath the said buzz saw in a line tangent to the edge thereof; a tubular bearing for said cutter of such diameter that it will pass into the aperture made by said cutter; a vertical plate on each of said sections, disposed in the same plane as said saw so that it will enter a saw kerf made thereby, to the edge of which said plate the said bearing is secured; suitable means for driving the said tubular cutter; means for drawing the air through the said tubular cutter; a suitable table disposed at the front of the said machine with a suitable paper clamp thereon, and means for raising and lowering the said table to bring the leaves clamped thereon into position to be acted upon by the said saw and cutter, coacting substantially as described and for the purpose specified.

2. In a perforating machine for leaves or sheets, the combination of a suitable frame made up of ends having horizontal lateral bars connecting the same; machine sections adjustably supported on the said lateral bars; a buzz saw with means to drive the same, carried on the upper portion of each of said machine sections; a tubular circular perforating cutter disposed beneath the said buzz saw in a line tangent to the edge thereof; a tubular bearing for said cutter of such diameter that it will pass into the aperture made by said cutter; a vertical plate on each of said sections, disposed in the same plane as said saw so that it will enter a saw kerf made thereby, to the edge of which said plate the said bearing is secured; suitable means for driving the said tubular cutter; means for drawing the air through the said tubular cutter; a suitable table disposed at the front of the said machine with a suitable paper clamp thereon; and means for raising and lowering the said table to bring the leaves clamped thereon into position to be acted upon by the said saw and cutter, coacting substantially as described and for the purpose specified.

3. In a perforating machine for leaves or sheets, the combination of a suitable frame made up of ends having horizontal lateral bars connecting the same; machine sections adjustably supported on the said lateral bars; a buzz saw with means to drive the same, carried on the upper portion of each of said machine sections; a tubular circular perforating cutter disposed beneath the said buzz saw in a line tangent to the edge thereof; a tubular bearing for said cutter of such diameter that it will pass into the aperture made by said cutter; suitable means for driving the said tubular cutter; means for drawing the air through the said tubular cutter; a suitable table disposed at the front of the said machine with a suitable paper clamp thereon; and means for raising and lowering the said table to bring the leaves clamped thereon into position to be acted upon by the said saw and cutter, coacting substantially as described and for the purpose specified.

4. In a perforating machine for leaves or sheets, the combination of a suitable frame; machine sections adjustably supported on the said frame; a buzz saw with means to drive the same, carried on the upper portion of each of said machine sections; a tubular circular perforating cutter disposed beneath the said buzz saw in a line tangent to the edge thereof; a tubular bearing for said cutter of such diameter that it will pass into the aperture made by said cutter; a vertical plate on each of said sections, disposed in the same plane as said saw so that it will enter a saw kerf made thereby, to the edge of which said plate the said bearing is secured; suitable means for driving the said tubular cutter; means for drawing the air through the said tubular cutter; a suitable table disposed at the front of the said machine with a suitable paper clamp thereon; and means for raising and lowering the said table to bring the leaves clamped thereon into position to be acted upon by the said saw and cutter, coacting substantially as described and for the purpose specified.

5. In a perforating machine for leaves or sheets, the combination of a suitable frame; machine sections adjustably supported on the said frame; a buzz saw with means to drive the same, carried on the upper portion of each of said machine sections; a tubular circular perforating cutter disposed beneath the said buzz saw in a line tangent to the edge thereof; a tubular bearing for said cutter of such diameter that it will pass into the aperture made by said cutter; suitable means for driving the said tubular cutter; means for drawing the air through the said tubular cutter; a suitable table disposed at the front of the said machine with a suitable paper clamp thereon; and means for raising and lowering the said table to bring the leaves clamped thereon into position to be acted upon by the said saw and cutter, coacting substantially as described and for the purpose specified.

6. In a perforating machine for leaves or sheets, the combination of a suitable frame; a buzz saw with means to drive the same carried on said frame; a tubular circular perforating cutter, disposed in the plane of said buzz saw in a line tangent to the edge thereof; a tubular bearing for said cutter, of such diameter that it will pass into the aperture made by the said cutter; a plate disposed in the same plane as the said buzz saw, to the edge of which said plate the said tubular bearing is secured; suitable means for driving the said tubular cutter; means for drawing air through the said tubular cutter; and a suitable table with paper clamps disposed and connected to coöperate with said saw and cutter, coacting for the purpose specified.

7. In a perforating machine for leaves or sheets, the combination of a suitable frame; a buzz saw with means to drive the same carried on said frame; a tubular circular perforating cutter, disposed in the plane of said buzz saw in a line tangent to the edge thereof; suitable means for driving the said tubular cutter; means for drawing air through the said tubular cutter; and a suitable table with paper clamps disposed and connected to coöperate with said saw and cutter, coacting for the purpose specified.

8. In a perforating machine for leaves or sheets, the combination of a suitable frame; a buzz saw with means to drive the same carried on said frame; a tubular circular perforating cutter, disposed in the plane of said buzz saw in a line tangent to the edge thereof; a tubular bearing for said cutter, of such diameter that it will pass into the aperture made by the said cutter; a plate disposed in the same plane as the said buzz saw, to the edge of which said plate the said tubular bearing is secured; suitable means for driving the said tubular cutter; and a suitable table with paper clamps disposed and connected to coöperate with said saw and cutter, coacting for the purpose specified.

9. In a perforating machine for leaves or sheets, the combination of a suitable frame; a buzz saw with means to drive the same carried on said frame; a tubular circular perforating cutter, disposed in the plane of said buzz saw in a line tangent to the edge thereof; suitable means for driving the said tubular cutter; and a suitable table with paper clamps disposed and connected to coöperate with said saw and cutter, coacting for the purpose specified.

10. In a perforating machine for leaves or sheets, the combination of a suitable frame; a slotting means; a tubular circular perforating cutter, disposed in the plane of said slotting means in a line tangent to the edge thereof; a tubular bearing for said cutter, of such diameter that it will pass into the aperture made by the said cutter; a plate disposed in the same plane as the said slotting means, to the edge of which said plate the said tubular bearing is secured; suitable means for driving the said tubular cutter; means for drawing air through the said tubular cutter; and a suitable table with paper clamps disposed and connected to coöperate with said slotting means and cutter, coacting for the purpose specified.

11. In a perforating machine for leaves or sheets, the combination of a suitable frame; a slotting means; a tubular circular perforating cutter, disposed in the plane of said slotting means in a line tangent to the edge thereof; suitable means for driving the said tubular cutter; means for drawing air through the said tubular cutter; and a suitable table with paper clamps disposed and connected to coöperate with said slotting means and cutter, coacting for the purpose specified.

12. In a perforating machine for leaves or sheets, the combination of a suitable frame; a slotting means; a tubular circular perforating cutter, disposed in the plane of said slotting means in a line tangent to the edge thereof; a tubular bearing for said cutter, of such diameter that it will pass into the aperture made by the said cutter; a plate disposed in the same plane as the said slotting means, to the edge of which said plate the said tubular bearing is secured; suitable means for driving the said tubular cutter; and a suitable table with paper clamps disposed and connected to coöperate with said slotting means and cutter, coacting for the purpose specified.

13. In a perforating machine for leaves or sheets, the combination of a suitable frame; a slotting means; a tubular circular perforating cutter, disposed in the plane of said slotting means in a line tangent to the edge thereof; suitable means for driving the said tubular cutter; and a suitable table with paper clamps disposed and connected to coöperate with said slotting means and cutter, coacting for the purpose specified.

14. In a perforating machine for leaves or sheets, the combination of a suitable frame; a tubular circular perforating cutter; a tubular bearing for said cutter, of such diameter that it will pass into the aperture made by the said cutter; suitable means for driving the said tubular cutter; means for drawing air through the said tubular cutter; and a suitable table with paper clamps disposed and connected to coöperate with said cutter, coacting for the purpose specified.

15. In a perforating machine for leaves or sheets, the combination of a suitable frame; a tubular circular perforating cutter; a tubular bearing for said cutter, of such diameter that it will pass into the aperture made by the said cutter; suitable means for driving the said tubular cutter; and a suitable table with paper clamps disposed and connected to coöperate with said cutter, coacting for that purpose specified.

16. In a perforating machine for leaves or sheets, the combination of a suitable frame; a slotting means; a tubular cutter coöperating with said slotting means; a tubular bearing for the said tubular cutter, of such diameter as to enter the hole formed thereby; a supporting plate therefor adapted to enter the said slot and carry the said tubular cutter therethrough; means to draw air through said tubular cutter; and suitable means for supporting the leaves in coöperating relation with said slotter and cutter, coacting as specified.

17. In a perforating machine for leaves or sheets, the combination of a suitable frame; a slotting means; a tubular cutter coöperating with said slotting means; a tubular bearing for the said tubular cutter, of such diameter as to enter the hole formed thereby; means to draw the air through said tubular cutter; and suitable means for supporting the leaves in coöperating relation with the said slotter and cutter, coacting as specified.

18. In a perforating machine for leaves or sheets, the combination of a suitable frame; a slotting means; a tubular cutter coöperating with said slotting means; a tubular bearing for the said tubular cutter, of such diameter as to enter the hole formed thereby; a supporting plate therefor adapted to enter the said slot and carry the said tubular cutter therethrough; and suitable means for supporting the leaves in coöperating relation with the said slotter and cutter, coacting as specified.

19. In a perforating machine for leaves or sheets, the combination of a suitable frame; a slotting means; a tubular cutter coöperataing with said slotting means; a tubular bearing for the said tubular cutter, of such diameter as to enter the hole formed thereby; and suitable means for supporting the leaves in coöperating relation with the said slotter and cutter, coacting as specified.

20. In a perforating machine for leaves or sheets, the combination of a suitable frame; a slotting means; a tubular cutter coöperating with said slotting means; means to draw air through said tubular cutter; and suitable means for supporting the leaves in coöperating relation with the said slotter and cutter, coacting as specified.

21. In a perforating machine for leaves or sheets, the combination of a suitable frame; a slotting means; a tubular cutter coöperating with said slotting means; and suitable means for supporting the leaves in coöperating relation with the said slotter and cutter, coacting as specified.

22. In a perforating machine for leaves or sheets, the combination of a suitable frame made up of ends having horizontal lateral bars connecting the same; machine sections adjustably supported on said lateral bars, with lateral adjusting screws for adjusting the same; slotting and perforating means supported on the said machine sections; a suitable table disposed in front of said machine, with suitable paper clamps thereon; and means for raising and lowering the said table to bring the leaves clamped thereon into position to be acted upon by said perforating means, coacting as specified.

23. In a perforating machine for leaves or sheets, the combination of a suitable frame made up with ends having horizontal lateral bars connecting the same; machine sections adjustably supported on said lateral bars, with means for adjusting the same; slotting and perforating means supported on the said machine sections; a suitable table disposed in front of said machine, with suitable paper clamps thereon; and means for raising and lowering the said table to bring the leaves clamped thereon into position to be acted upon by said perforating means, coacting as specified.

In witness whereof, I have hereunto set my hand and seal in the presence of two witnesses.

CYRUS E. MOREHOUSE. [L. S.]

Witnesses:
W. L. GOLD,
MARIE F. RADCLIFFE.